(12) United States Patent
Mayo et al.

(10) Patent No.: US 6,205,147 B1
(45) Date of Patent: *Mar. 20, 2001

(54) VIRTUAL NETWORK ARCHITECTURE

(75) Inventors: Brian T. Mayo, Groton; Stanley P. Sassower, Burlington; Joseph N. Horowitz, Lawrence, all of MA (US); Landis C. Rogers, Kingston, NH (US)

(73) Assignee: Newbridge Networks Corporation, Kanata (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,196

(22) Filed: Feb. 11, 1997

(51) Int. Cl.[7] ..................................................... H04L 12/56
(52) U.S. Cl. ............................................ 370/397; 370/409
(58) Field of Search .................................. 370/389, 392, 370/395, 396, 397, 400, 401, 402, 407, 409, 428, 445, 446; 714/819, 820, 822, 824; 709/238, 249, 252; 395/500

(56) References Cited

U.S. PATENT DOCUMENTS

| | | | |
|---|---|---|---|
| 4,901,348 | 2/1990 | Nichols et al. | 380/49 |
| 5,140,585 * | 8/1992 | Tomikawa | 370/446 |
| 5,161,192 | 11/1992 | Carter et al. | 380/48 |
| 5,177,788 | 1/1993 | Schanning et al. | 380/23 |
| 5,251,203 * | 10/1993 | Thompson | 370/407 |
| 5,392,399 * | 2/1995 | Gilbrech | 370/401 |
| 5,394,402 | 2/1995 | Ross | 370/402 |
| 5,448,565 * | 9/1995 | Chang et al. | 370/402 |
| 5,515,376 * | 5/1996 | Murthy et al. | 370/402 |
| 5,539,737 * | 7/1996 | Lo et al. | 370/401 |
| 5,550,816 | 8/1996 | Hardwick et al. | 370/60 |
| 5,610,905 * | 3/1997 | Murthy et al. | 370/401 |
| 5,724,351 * | 3/1998 | Chao et al. | 370/389 |
| 5,740,171 * | 4/1998 | Mazzola et al. | 370/392 |

FOREIGN PATENT DOCUMENTS

| | | | |
|---|---|---|---|
| 0 431 751 A1 | 2/1990 | (EP) | H04L/12/46 |
| 2 269 724 | 2/1994 | (GB) | H04L/12/56 |
| WO 89/0952 | 10/1989 | (WO) | H04L/11/20 |
| WO 95/01023 | 1/1995 | (WO) | H04L/12/18 |
| WO 96/04729 | 2/1996 | (WO) | H04J/5/00 |

* cited by examiner

*Primary Examiner*—Alpus H. Hsu
(74) *Attorney, Agent, or Firm*—Townsend and Townsend and Crew LLP

(57) ABSTRACT

A network infrastructure comprises a number of connective devices (routers, repeaters, bridges, etc.) to form a communication network for a plurality of end nodes. Message packets originating with an end node are assigned an input virtual network and workgroup identification at the port at which the packet enters the network. This assigned input virtual network and workgroup identification is compared, at each port from which the packet can exit the network infrastructure, with output virtual network and workgroup identification assigned the particular port. If the input virtual network information does not match the output virtual network information, the packet is prohibited from exiting that port. Even if there is a match between the input and output virtual network information, there must also be a match between at least one bit of the input workgroup identification and the output workgroup identification before the packet can exit the port.

16 Claims, 3 Drawing Sheets

VIRTUAL NETWORK ARCHITECTURE

BACKGROUND OF THE INVENTION

The present invention relates generally to networks of the type that connect two or more data processing elements to one another for data communication. More particularly, the invention relates to a method and apparatus for dividing a physical network into a number of separate, "virtual" networks and work groups. Communication is then allowed only between elements that are members of the same virtual network and workgroup.

The recent growth of the personal computer market has been accompanied by the desire to interconnect numbers of personal computers for resource sharing, distributed processing, and like data processing functions. Such interconnectivity is often accomplished using local area network (LAN) or wide area network (WAN) topologies. A LAN topology typically interconnects data processing equipment in a limited geographic area by such physical media as twisted pair wiring or coaxial cable and various connective devices such as repeaters, routers, and bridges. Information is communicated by message packets.

Repeaters operate to repeat information from one transmitting medium to all others to which the repeater connects; that is, a repeater connects segments of the same network to form an extended network, and message packets received by the repeater are repeated to all connected segments. Bridges, on the other hand, connect separate LANs. Bridges typically operate to pass message packets on one LAN to another LAN if the destination of that message packet is not located on the source LAN, examining the message packet to determine onto which network the message packet should be forwarded.

Routers also connect separate LANs. They are capable of communicating with end nodes and other routers, by which communication they determine internal routing tables. Message packets are forwarded based upon destination address contained in the message packets and these routing tables.

Since bridges and routers are capable of selective communication of message traffic, they do perform some message security functions. One limitation of this is that end nodes (the data processing elements interconnected by the network) on the same local area network (LAN) have access to all message packets sent to any one of them.

Recent advances in the industry have provided repeaters with the ability to perform security functions in order to preclude connected end nodes from receiving message packet. Examples of such message security is found in U.S. Pat. Nos. 5,177,788, 5,161,192, and 4,901,348. A message packet received by a repeater will be examined for source and/or destination information contained in the message packet. Based upon that examination, a determination is made as to which ports of the device will be allowed to re-send the message packet, and which will be precluded from re-sending.

SUMMARY OF THE INVENTION

The invention is preferably employed in a network infrastructure of a type including a number of connective devices (e.g., repeaters, routers, and bridges) interconnected to provide data communication between data processing elements. Specifically, the invention provides a method, and apparatus for implementing that method, for controlling message traffic and bandwidth within a network based upon the entry and exit points of the network infrastructure used by the message traffic. The invention operates to prevent unauthorized communication, limiting transmission of message traffic from the network infrastructure to only those exit points authorized—based upon the point of entry to the network infrastructure of the message traffic.

Broadly, the invention allows the physical configuration of a network infrastructure to be sub-divided into a number of "virtual" networks. Entry/exit points to the network infrastructure for end nodes (i.e., data processing equipment such as workstations, peripherals, and shared resources) are assigned to one or another of the virtual networks, thereby assigning the connected end nodes to the corresponding virtual networks. Further, according to the invention, each virtual network may be divided into workgroups, and the entry/exit points (and, therefore, the connected end nodes) assigned to one or more such workgroups. Communication between the end nodes is limited to those assigned to specific virtual networks and workgroups.

In a preferred embodiment of the invention the network infrastructure employs a number of connective devices (routers, repeaters, bridges, and the like) that are interconnected to one another. They connect to end nodes by physical transmission media such as twisted pair wiring or coaxial cable. The network infrastructure provides data communication for message traffic in the form of message packets between end nodes that connect to ports (entry/exit points) of the infrastructure by physical media. According to the invention, each port providing entry/exit access to/from the network infrastructure is provided with virtual network identification (VNID) information. Entry points to the network infrastructure are assigned an input virtual network identification (I-VNID), and all message packets incoming through a port of the network infrastructure (i.e., at a particular connective device) from an end node will have the I-VNID information assigned to that port associated with the packet. This association is maintained as long as the packet remains in the network infrastructure.

Similarly, exit points from the network infrastructure are assigned an outgoing virtual network identification (O-VNID). A port may have an assigned I-VNID that is the same as its assigned O-VNID, or the assigned I-VNID and O-VNID for the port may be different.

When a message packet has entered the network infrastructure, and in so doing been assigned I-VNID information, that I-VNID information is checked at all ports of the network infrastructure at which the packet seeks departure by comparing the message packet's I-VNID information with the O-VNID information of the departure port. If the I-VNID information of the packet matches the O-VNID of the port, the packet will be transmitted from the port. Conversely, if there is no such match, the packet will not be transmitted.

In the preferred embodiment of the invention the VNID information includes two separate fields: one to identify the particular virtual network to which a port is assigned, and the second to identify one or more "workgroup" divisions of which the port is a member. Generally then, message packets are allowed to exit only those ports having O-VNID information that identifies a virtual network and workgroup assignment that matches that allocated the message packet by the port of its entry. (As will be seen, the virtual network assignments must match exactly, but only one of the number of possible workgroup assignments need match for exit from a port.) On the other hand, the port will not send the message packet if the I-VNID information associated with the message packet does not match the O-VNID of the port from which the packet seeks to exit.

In the case of exit ports in a repeater, if the exit port is of a virtual network different from that identified in the I-VNID information of the message packet, or if there is no workgroup match, the message will exit the port with the data of the message replaced with a meaningless bit pattern.

There are a number of advantages achieved by the present invention. By dividing a physical network infrastructure in the manner proposed by the invention, message packets can be allocated to limited numbers of ports and end nodes rather than allowing the message packets to propagate through the entire system. In one embodiment of the invention, the capability of being able to preclude retransmission of a message from a port exit that is not a member of virtual network/workgroup associated with the packet provides a way to manage bandwidth on a media segment. End nodes of a particular media segment will see only those message packets originating with the other end nodes (if any) connected to that media segment and such other message packets from the network infrastructure having a I-VLAN/ workgroup that matches the O-VNID/workgroup of the media segment's port.

Another advantage is the security provided by the invention. Only those end nodes connected to ports of the network infrastructure that have matching I-VNID/O-VNID/ workgroup assignments will see information contained in the packets; all other end nodes will either see nothing, or a message with the data content obliterated.

Still another advantage of the present inventions is its ability to allow multiple bridges connected in parallel between two networks to load share. In this use of the invention, consider two 2-port bridges that each connect between the same two groups of stations. One bridge and some of the stations would be assigned to a first virtual network. The remainder of the stations and the second bridge would be assigned to a second virtual network. The bridges will then only see and possibly forward message packets associated with the particular virtual network to which they are assigned.

These and other advantages and features of the invention will become apparent upon a reading of the following detailed description, which should be taken in conjunction with the accompanying drawings in order to obtain a full appreciation of the invention and its use.

DETAILED DESCRIPTION OF THE INVENTION

Figure 1:
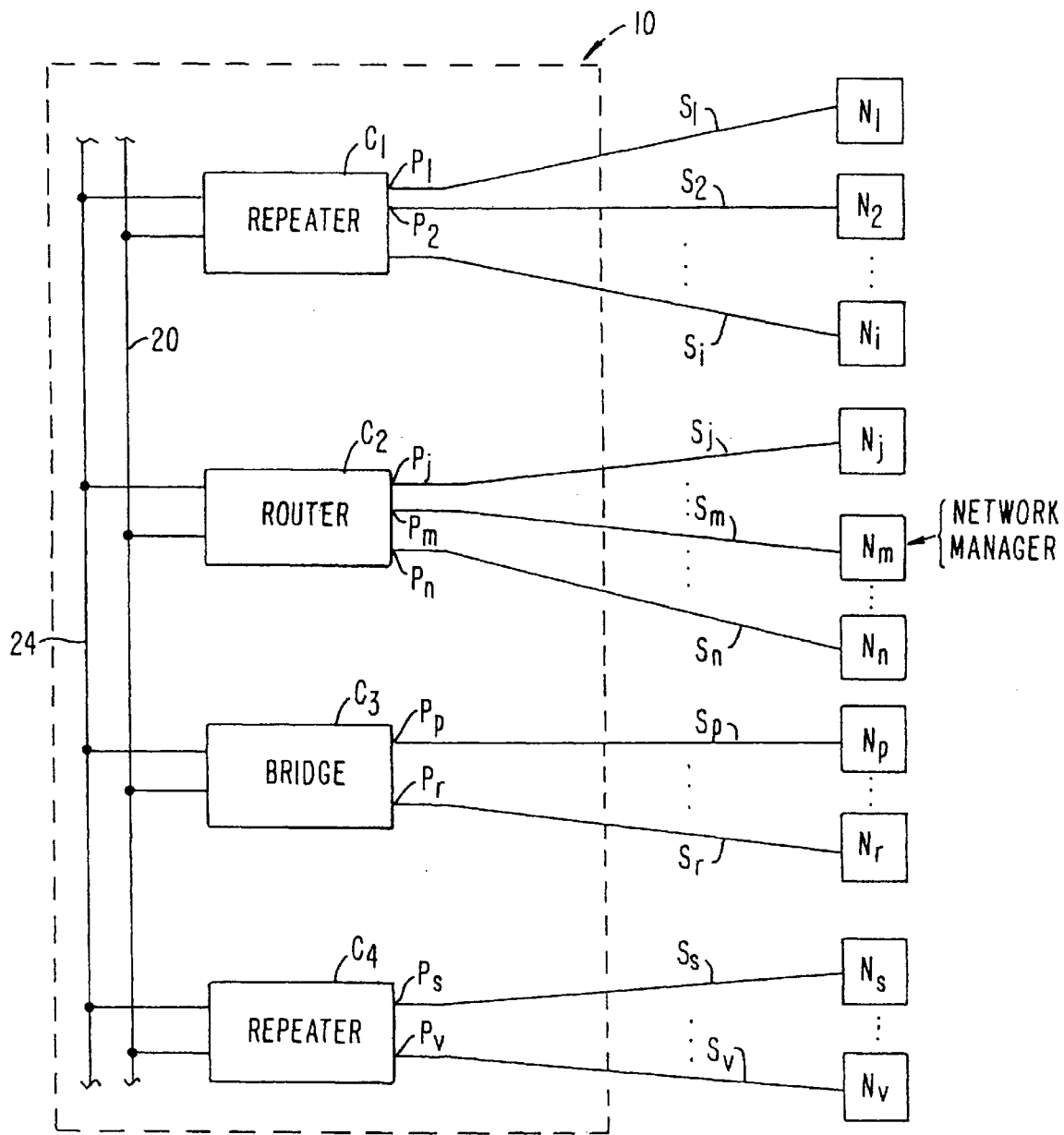
FIG. 1 is a diagrammatic representation of a network infrastructure incorporating the present invention.

Referring now to the figures, and for the moment specifically FIG. 1, broadly represented is a network infrastructure designated with the reference numeral 10. The network infrastructure 10 typically will include any reasonable number of network connective devices C three types of which are illustrated here: repeaters $C_1$ and $C_4$, a router $C_2$, and bridge $C_3$, although, as will be apparent, other connective devices may be included in the network infrastructure.

As FIG. 1 shows, the connective devices C ($C_1$, $C_2$, $C_3$, and $C_4$) are joined in a network topology that employs a backbone bus 20 to which the connective devices are attached. (In a preferred embodiment of the invention the backbone bus 20 is formed by a printed circuit backplane (not shown) to which printed circuit boards (not shown) carrying the connective devices C connect in conventional fashion such as through multi-pin connectors.) It will be evident to those skilled in the art, upon further reading of the following disclosure, that the particular topology employed is not important to the present invention. Star, distributed and other network topologies may incorporate the invention.

The connective devices C serve as entry and exit points to the network infrastructure 10 for nodes N ($N_1$, $N_2$, ... $N_v$) which connect to the network infrastructure by media segments S ($S_1$, $S_2$, ..., $S_v$) through communication port P ($P_1$, $P_2$, ..., $P_v$). FIG. 1 also illustrates an end node Nm, connected to the connective device C2, as being assigned network management functions for managing the network infrastructure 10 in conventional fashion which, according to the present invention, will include assigning the I-VNID and O-VNID information to the ports P. Communication between the network manager node Nm and the connective devices C is by a management bus 24. The structure and function of the management bus 24 is conventional.

It is at each of these entry/exit points that assignment to a particular virtual network workgroup membership occurs. According to the present invention, each media segment S (and therewith the end nodes N that are connected to the network infrastructure 10 by the media segment S) is separately assignable to a virtual network and workgroup(s).

Before continuing, it will be appreciated by those skilled in this art that although only single end nodes N are shown in FIG. 1, that does not indicate that each is a single element (e.g., a work station in the form of a personal computing device, or a printer, or file server). Rather, each end node N may be a single processing element or a number of processing elements connected to a media segment S. If there is more than one processing element using a media segment S, all those processing elements will be, in effect, assigned membership to the same VLAN and workgroup(s) by the port P to which the particular elements represented by an end node N connect.

The connective devices perform their usual function except as modified by the incorporation of the virtual network concepts of the present invention. Thus, the connective device $C_1$ performs repeater functions in which message traffic received from any of the connected end nodes ($N_1$, $N_2$, ..., $N_i$) will be repeated to the backbone bus 20 as well as to those other ports of the repeater whose O-VNID matches the I-VNID associated with the message. Transmission to the backbone bus 20 preferably is unrestricted. The repeater will also pick up message traffic sent by other devices C onto the backbone bus. The connective device $C_3$ functions as a bridge to communicate message traffic from one of media segments $S_p$, ..., $S_r$ and/or the backplane bus to other media segment(s) and/or the backbone bus, with the added requirement of a match at its exit ports between the I-VNID and O-VNID information. Similarly, the router $C_2$ will transmit such traffic as would a normal router, with the added requirement of a match between the I-VNID and O-VNID information at its exit ports $p_j$, ..., $P_n$.

The network infrastructure 10 is structured to implement the Ethernet protocol according to IEEE 802.3 standard which uses a carrier sense multiple access with collision detection (CSMA/CD) access method in which data is sent in message packets. However, it will soon be evident to those skilled in this art, if not already, that other network protocols and implementations (e.g., asynchronous transfer mode, token ring, FDDI) can be used to employ the invention. To implement the IEEE 802.3 protocol, this implementation uses the following signals carried by the backbone bus 20: (1) a carrier sense signal to indicate when a message packet is in process, (2) a collision detection signal line to identify that two or more end nodes are attempting to send at the same time, and, of course, (3) a data signal. The three signals are communicated by the connective devices C, and carried by the backbone bus 20, in conventional fashion. But, according to the present invention, an additional signal is carried by the backbone bus 20 to communicate the I-VNID information associated with a message packet. It will be appreciated, however, that the VNID information need not be carried on a separate signal line. For example, the carrier sense signal could be alternated with the I-VNID information, and later the two signals could be extracted when they are received off the backbone bus. In the context of this implementation, however, for reasons not pertinent to the invention, the I-VNID information of a packet travels with, but separate from, the message packet while on the backbone bus 20. As will be seen, each port P from which the message packet can exit the network infrastructure 10 will check the associated I-VNID of the packet to determine, in a manner discussed below, if the message packet is authorized to be transmitted from that port.

Figure 2:
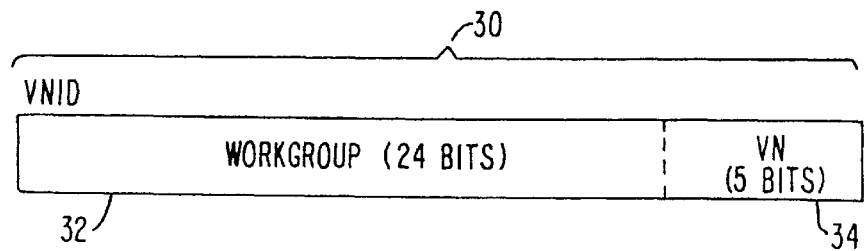
FIG. 2 is an illustration of the format used for the I-VNID and O-VNID information that is assigned to each port of the network infrastructure of FIG. 1.

FIG. 2 illustrates the organization of the structure of VNID information which may be either I-VNID or O-VNID information, depending upon whether it is information at an entry or an exit of a port P, respectively. As FIG. 2 shows, the VNID information, designated with the reference numeral 30, has two separate data fields: a 24-bit workgroup field 32 and a five-bit virtual network (VN) 34.

The VN field 34 will identify one of up to 32 virtual networks, allowing the network infrastructure 10 to be divided into 32 virtual networks. If more are needed, the VN field 34 can be expanded—although timing limitations (e.g., the time for a repeater to re-transmit a received message packet) may restrict the expansion. A message packet that is assigned to a virtual network can exit only those ports assigned to the same virtual network.

The port P on which a message packet has entered will also have membership in zero or more workgroups within the assigned virtual network. Workgroup membership is identified setting one or another bit portion of the workgroup field 32 to a particular state (e.g., a logic ONE). Each bit position of the workgroup field 32 signifies, when set, membership in the workgroup represented by that bit position. Conversely, a bit position set to the opposite state identifies non-membership.

Each port P of the network infrastructure 10 is assigned both an input VNID (i.e, I-VNID) and an output VNID (O-VNID), both structured as shown in FIG. 2. Every message packet entering the network infrastructure 10 will have associated with it the I-VNID assigned to the port P at which the message packet entered. This associated I-VNID will be compared to each port P at which the message packet seeks exit, and will be allowed to exit the port P only if the VN data fields 34 of both match, and if at least one bit of the workgroup field of both is set to a state that indicates membership in the corresponding workgroup.

As an example, assume that devices connected to the access ports $P_1$ and $P_2$ of connective device $C_1$, port $P_j$ of connective device $C_2$, and port $P_r$ of connective device $C_3$ are assigned to a virtual network VN1. Thereby, message traffic originating with any of the end nodes $N_1$, $N_2$, $N_j$, and $N_r$ will be associated with virtual network VN1. Assume further that the devices connected to access ports $P_m$, and $P_p$, are assigned to a virtual network VN2. Within the virtual network VN1 there may be one or more workgroups to which the end nodes $N_1$, $N_2$, $N_j$, $N_n$ are assigned. Also assume that for each of those ports, the O-VNID assignment will be identical to the I-VNID assignment. (Were they different, an end node could send messages to one group, and receive message only from another virtual group.)

Now, message traffic from end node $N_2$ (a member of virtual network VN1) will enter the network infrastructure at the associated access port $P_2$, to be re-transmitted from only those exit ports P belonging to the same virtual network (VN1) and having membership in at least one of the same workgroups in which $P_2$ holds membership. Message traffic from end node $N_2$ will be blocked at the exits provided by those ports of the network infrastructure not assigned to virtual network VN1, such as those assigned to VN2, as well as by those access ports assigned to virtual network VN1, but not having membership in any workgroup in which access port $P_2$ holds membership.

Access ports P may be assigned to multiple workgroups. For example, the access port $P_1$ may have a I-VNID that assigned incoming message traffic to engineering, purchasing, and MIS workgroups so that Message traffic originating with the end nodes sharing the media segment $S_1$ that connects to entering access port $P_1$ will be re-transmitted from those access ports (of virtual network VN1) holding membership in at least one of those workgroups.

Figure 3:
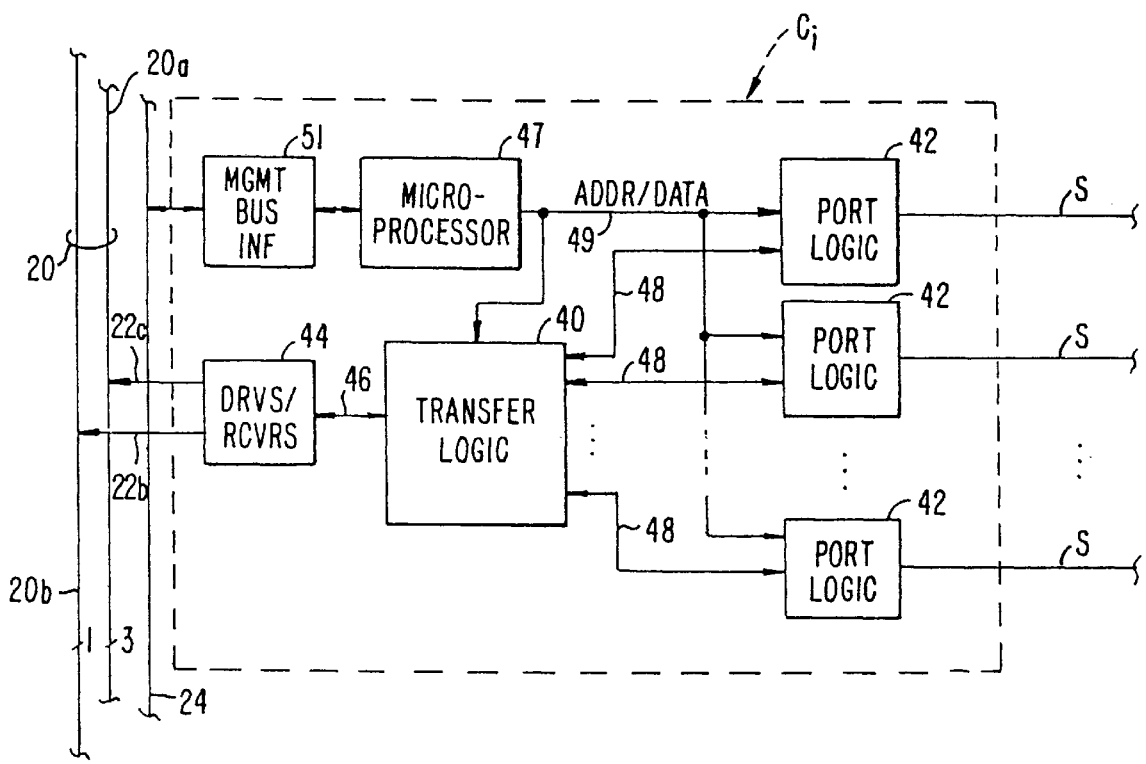
FIG. 3 is a general block diagram of a generic connective device used in the network infrastructure of FIG. 1 and incorporating the present invention.

Turning now to FIG. 3, a representative connective device, designated as $C_i$, is illustrated. The connective device $C_i$ is meant to represent any of the connective devices C1, . . . , C4 of FIG. 1. FIG. 3 shows the connective device $C_i$ as including transfer logic 40 individually connected to each of a plurality of port logic modules 42 by signal lines 48. Transfer logic 40 is also connected, by signal lines 46, to driver/receiver circuits 44 that, in turn, connect the device $C_i$ to the backbone bus 20.

The transfer logic 40, and the port logic modules 42, are connected to a microprocessor 47 which communicates with the transfer logic 40 and port logic modules 42 by an address/data (Addr/Data) bus 49. The microprocessor 47 connects to the management bus 24 through a management bus interface 51. Information configuring the connective device is sent by the network manager node $N_m$ (FIG. 1) to the microprocessor 47. The microprocessor, then, operates to write any necessary registers (not shown) of the transfer logic 40 to direct its operation, or to write VN and workgroup registers (FIG. 4) contained in the port logic modules 42 with VNID (i.e., I-VNID or O-VNID) information.

The particular construction of the transfer logic 40 depends upon the type of connective device. If, for example, the connective device $C_i$ is a repeater, then the transfer logic 40 would take on the form of conventional repeater logic so that the connective device $C_i$ performs conventional repeater functions, receiving the signals of message traffic, regenerating and reclocking those signals for re-transmission. Alternatively, if the connective device $C_i$ takes the form of a multi-port bridge to connect networks, the transfer logic will perform the conventional bridging functions. Similarly, if the connective device $C_i$ is a router, the transfer logic is structured to perform conventional routing functions. Whatever the form the connective device $C_i$ takes is immaterial to the implementation of the present invention, as will be seen.

Continuing with FIG. 3, the port logic modules 42 are structured to communicate with the end nodes connected to the ports by the media segments S (e.g., twisted-wire pairs, co-axial cable). Each port logic module 42 incorporates virtual network logic that is responsible for assigning the I-VNID and information to the incoming message packets. The port logic modules 42 also include the logic and circuitry for maintaining the O-VNID information assigned the port, and comparing the O-VNID information to the I-VNID associated with message traffic sent to the port. The port transmits the message traffic onto the media segment S using driver/receiver circuits appropriate to the media used. The comparison performed will conclude in one of three actions, depending upon the configuration used: First, the message packet will be retransmitted from the port without modification if the I-VNID associated with the message packet matches O-VNID of the port. If the I-VNID information does not match the O-VNID assigned to the port, in one embodiment of the invention, the message packet will be discarded; in another embodiment of the invention the information content (data) of the message packet will be replaced with either a meaningless quantity (e.g., an alternating sequence of ones and zeros), or an encrypted version of the information content. For this latter embodiment the teachings of U.S. Pat. No. 5,177,778 may be used insofar as replacement of portions of a packet with less intelligible information is considered.

Message packet transfers between connective devices includes transfers of associated I-VNID information. As FIG. 3 illustrates, the backbone bus 20 is divided into two separate sub-busses 20a and 20b. The sub-bus 20a is structured to carry the message packet and associated signalling necessary for the IEEE 802.3 protocol, while the sub-bus 20b carries ("out-of-band") the I-VNID information associated with the message packet being transmitted on the sub-bus 20a.

Figure 4:
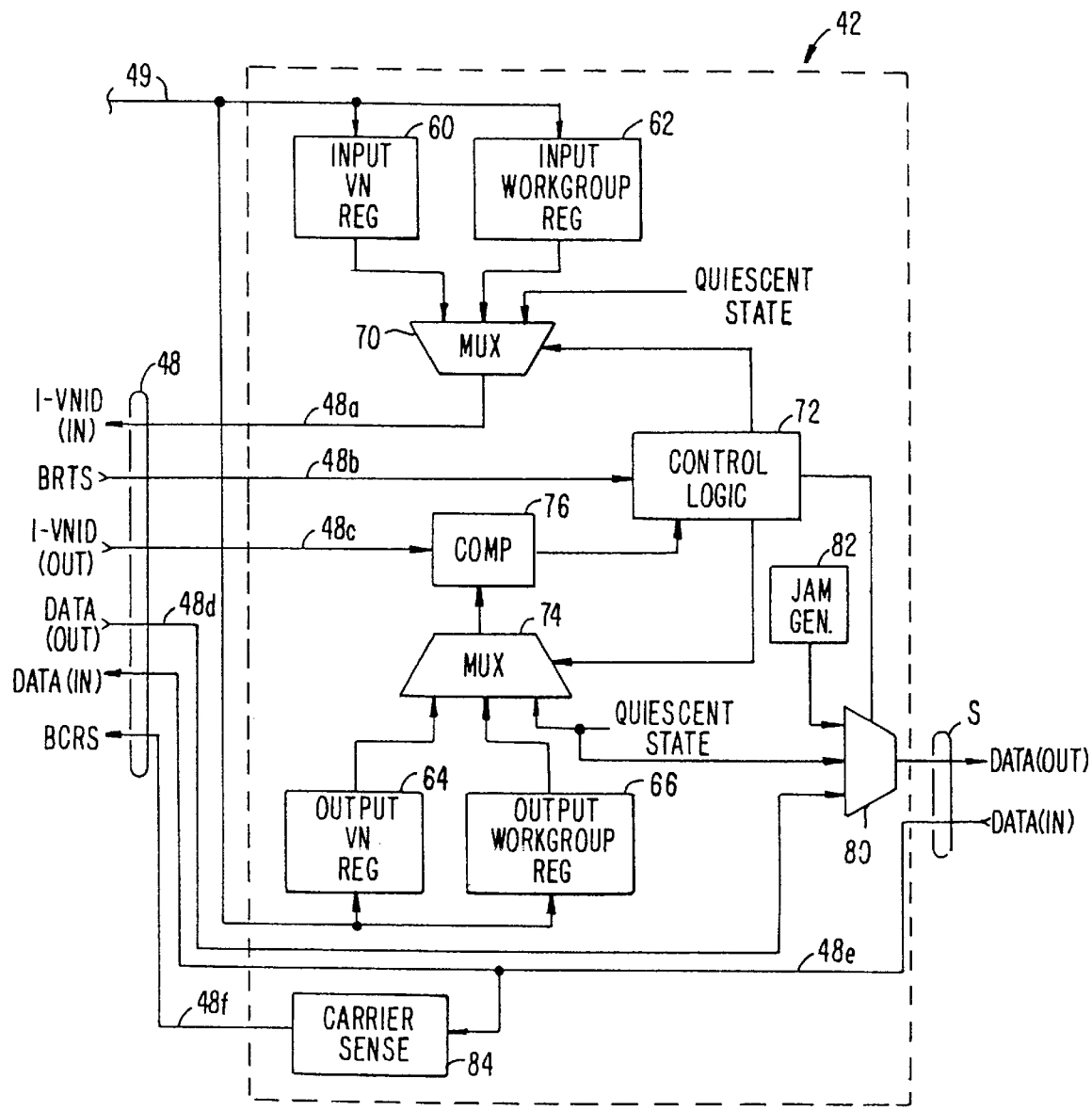
FIG. 4 is a block diagram illustrating the construction of the VNID logic associated with each port of the connective device of FIG. 3.

FIG. 4 shows the port logic module 42 in greater detail. The port logic module 42 includes two pairs of registers: 60-62, and 64-66. Registers 60 and 62 respectively hold the I-VNID and workgroup information assigned to incoming message from the media segment S. Register 60 contains the five bits of VN information, while register 62 contains the 24 bit workgroup data.

The content of registers 60, 62 are applied to the multiplexer 70. Under management of control logic 72, selection is made by the multiplexer 70 between the registers 60, 62, or a "quiescent state," creating the I-VNID information that is passed, with each message received from the media segment S, to the transfer logic 40 (FIG. 3).

Digressing for the moment, not specifically shown are optional network agent(s) that may operate in conventional fashion as an intermediary between the network's network manager (i.e., end node, ($N_m$) and the management bus. Typically, one or more connective devices are mounted on a chassis, and that chassis may include the network agent(s) (not shown). The agent(s) may also connect to the backbone bus 20 for receiving and translating administrative commands issued by the network manager end node $N_m$ via another device C. The translation of those commands is communicated to the object of the command—the connective device affected by the command—via management bus 24. Thus, for example, a network administrator may wish to assign (or reassign) port $P_2$ of the connective device (repeater) $C_1$ (FIG. 1) a new I-VNID or O-VNID (or both).

The network manager end node $N_m$ issues a command that is communicated to the agent(s) (not shown) in the chassis containing the connective device $C_1$. The agent(s), in turn will translate the command, and communicate it to the network device $C_1$ (specifically to the microprocessor 47 of the connective device $C_1$) to carry out the command, i.e., to cause the registers 60, . . . , 66 of port $P_2$ to be loaded with whatever the command specifies. The microprocessor 47 of the connective device in question will communicate the I-VNID and/or O-VNID information to the appropriate port logic module 42.

Returning again to FIG. 4, the port logic module 42 is shown as also including a multiplexer (MUX) 74 whose output is applied to one input of compare logic 76. The MUX 74, under control and supervision of the control logic 72, selects between the content of registers 64, 66, and a QUIESCENT STATE for application to the compare logic 76. The second input of compare logic receives, from the transfer logic 40, the I-VNID associated with any message packet forwarded to the port logic module. The output of the compare logic 76 is applied to control logic 72 which operates to control multiplexer 80. Multiplexer 80 is discussed below.

The signals communicated by the signal lines 48 between the transfer logic 40 and the port logic module 42 include those shown in FIG. 4. The I-VNID information contained in registers 60, 62 and associated to incoming (from media segment S) message packets is conveyed to the transfer logic 40 via signal line 48a. The BRTS signal is carried by signal line 48b, and is used by the transfer logic 40 to inform the logic modules 42 of an active outgoing message packet towards the media segments. Similarly, the signal line 48c carries the I-VNID information associated with the message packet being forwarded to the port logic module for transmission on the media segment S. The associated message packet is carried to the port logic module by the signal line 48d. Incoming message packets from the media segment S are carried from the media segment S to the transfer logic 40 by signal lines 48e. The incoming message packet is also applied to a carrier sense generator 84 which generates the carrier sense signal (BCRS) that is carried to the transfer logic 40 by the signal line 48f.

In operation, an in-coming message packet is first transmitted by an end node on the media segment S, received by the receivers of driver/receiver circuits (not shown) of the port, and transferred to the transfer logic 40—in conventional fashion. At the same time, the I-VNID assigned the receiving port 42 is associated with the incoming message packet by transferring the information content of registers 60, 62 (FIG. 4) to the transfer logic 40 (FIG. 3) via the lines 48a of the bus lines 48. Accordingly, the control logic 72 switches the MUX 70 to first selectively communicate (serially) the information contained in the register 60, and then the workgroup information of register 62, onto the bus portion 48a. Thus, the incoming message packet on signal line 48e, and that port's VN and workgroup information (making up the port's I-VNID) are communicated to the transfer logic 40 for communication to the backbone bus 20, and to the ports 42, depending upon (1) the destination of the message packet as identified by the destination address field contained in the frame, and (2) the make-up of the connective device $C_i$ (i.e., whether it is a repeater, router, or bridge). Wherever the received message packet goes, it will be accompanied by the I-VNID information. If the message packet is transmitted onto the sub-bus 20a, the associated I-VNID information will accompany the message packet on the sub-bus 20b.

Outgoing message packets to the media segment S are handled by port logic module 42 in the following manner: Before a message packet is communicated to a port logic module 42 by the transfer logic 40, the associated I-VNID is transferred via bus portion 48c and applied to one input of the compare logic 76. The control logic is alerted to impending receipt of a message packet by assertion of a BRTS signal on the bus portion 48b. Control logic will first select the content of register 64 for application to compare logic 76, via the MUX 74. The result of the comparison is passed to control logic 72. The compare logic then switches the MUX 74 to select the content of the register 66. Whereas the associated virtual network portion of the I-VNID of the message packet had to match the content of the register 64 exactly, not so the comparison of the content of the register 66: a single bit match is sufficient. (It is also possible to disable checking of either or both the VN and workgroups.) However, if either comparison is unsuccessful, the message packet will not be communicated on the media segment S via driver circuits (not shown). Rather, the control logic 72 will operate the MUX 80 to select, in place of the message packet, the output of the JAM generator to transmit instead a meaningless pattern of some sort, or encryption of the message packet or the quiescent state. The JAM signal will be transmitted as per the CSMA/CD protocol used in the case of a repeater.

While a full and complete description of the invention has been provided in the context of a specific implementation, it will be obvious to those skilled in this art that changes and modification can be made. For example, the I-VNID and O-VNID information need not be limited to a 5-bit quantity for identifying a virtual network, or a 24-bit workgroup identification. Rather, other field sizes can be used to accommodate the particular employment of the invention. Similarly, the I-VNID information need not be carried on a separate signal line but can be multiplexed with another signal onto a single signal line. Also, the I-VNID and O-VNID could be constrained to have the same value within each port, allowing use of a single resist instead of two.

Also, while the invention has been described in the context of the IEEE 802.3 standard, it can easily be employed in other protocols such as asynchronous transmission mode (ATM), token ring, or FDDI, to name a few.

What is claimed is:

1. In a data communicating network, including at least one connective device for communicating data among transmitting/receiving nodes, the connective device including:

a plurality of ports coupled to respective ones of the transmitting/receiving nodes, each of the plurality of ports having a storage element for storing a virtual network input identification and a virtual network output identification, each of the plurality of ports being communicatively coupled to each of the other of the plurality of ports for communicating data therebetween;

each of the ports having a compare component coupled to receive the virtual network input identification of a one of the plurality of ports at which data is received and to compare the virtual network input identification of said one port with the virtual network output identification of the each of the plurality of ports to transmit the data from such of the plurality of ports having an virtual network output identification matching the virtual network input identification of the one of the plurality of ports.

2. The data communicating network of claim 1, wherein the storage element includes an input register for storing the virtual network input identification and an output register for storing the virtual network output identification.

3. The connective device of claim 1, wherein the virtual network input identification and the virtual network output identification of each of the plurality of ports each includes first and second multi-bit fields.

4. The connective device of claim 3, wherein the compare component operates to transmit the data from such of the plurality of ports having a first field of an output identification matching a first field of the virtual network identification of the one of the plurality of ports.

5. In a data communicating network that includes at least one connective device for communicating data among transmitting/receiving nodes, the connective device having a number of ports coupled to corresponding ones of the transmitting/receiving nodes to receive data from, and transmit data to, such nodes, a method of transmitting data received at one of the number of ports from selected ones of the number of ports that includes the steps of:

providing each of the number of ports with a virtual network input identification and a virtual network output identification;

receiving data at the one of the number of ports;

communicating the received data and the virtual network input identification of the one of the number of ports to each of the number of ports;

at each of the number of ports, comparing the communicated virtual network input identification with the virtual network output identification of each of the ports to transmit the data from such of the number of ports having an virtual network output identification matching the communicated virtual network input identification.

6. The method of claim 5, wherein the virtual network input and output identifications provided each of the number of ports each include a multi-bit field, and the comparing step includes the step of transmitting the data from such one of the ports if at least one bit of the multi-bit field of the virtual network input identification of the one of the number of ports matches a corresponding bit provided the virtual network output identification of such port.

7. The method of claim 5, wherein the comparing step includes transmitting the data from each of the number of ports having an virtual network output identification having at least one bit matching a corresponding one bit of the virtual network input identification of the one of the number of ports and an n-bit field of the virtual network output identification matching a corresponding n-bit field of the virtual network input identification of the one of the number of ports.

8. The method of claim 5, wherein the comparing step includes the step of comparing the virtual network output information provided each of the plurality of ports with the virtual network input information of the one of the number of ports to transmit the data if at least portions match.

9. The method of claim 5, wherein the step of providing includes providing each of the number of ports with a virtual network input identification having first and second multi-bit fields and a virtual network output identification having third and fourth multi-bit fields.

10. The method of claim 9, wherein the comparing step includes the step of transmitting the data from such of the number of ports having a virtual network output identification with a third field matching the first field of the communicated virtual network input identification.

11. The method of claim 10, wherein the comparing step includes the step of transmitting the data from such of the number of ports having a virtual network output identification with a fourth field having at least one bit position matching a corresponding bit position of the first field of the communicated virtual network input identification.

12. A connective device for communicating data among a number of transmitting/receiving nodes in a data communicating network, the connective device including:

a plurality of ports coupled to respective ones of the number transmitting/receiving nodes, each of the plurality of ports being communicatively coupled to each of the other of the plurality of ports for communicating data therebetween;

each of the plurality of ports including,
a storage element for storing a virtual network input identification and an output identification,
a compare component coupled to receive the virtual network input identification of one of the plurality of ports at which data is received and to assert a selection signal if at least a first portion of the virtual network input identification of the one of the plurality of ports matches a corresponding portion of the virtual network output identification of such ports, and
a selection component coupled to the compare component to transmit the data from such port when the selection signal is asserted.

13. The connective device of claim 12, wherein the compare component asserts the selection signal if the virtual network input identification includes a second portion also having at least one bit position set to match a corresponding bit position of a second portion of the virtual network output identification of such port.

14. A connective device for communicating data among a number of transmitting/receiving nodes in a data communicating network, the connective device including:

a plurality of ports coupled to respective ones of the number transmitting/receiving nodes, each of the plurality of ports being communicatively coupled to each of the other of the plurality of ports for communicating data therebetween;

each of the plurality of ports including
a storage element for storing a virtual network input identification having first and second multi-bit fields and a virtual network output identification having third and fourth multi-bit fields,
a compare element operating to receive and compare the first multi-bit field of the virtual network input identification of a one of the plurality of ports at which data is received with the third multi-bit field of the virtual network output identification of such port, and
a selection element coupled to the compare component to select for transmission the data from the one of the plurality of ports having a first multi-bit field matching the third multi-bit field of such port.

15. The connective device of claim 14, wherein the storage element comprises an input storage register for holding the virtual network input identification and output register for holding the virtual network output identification.

16. The connective device of claim 15, wherein the input register includes first and second registers for respectively holding the first and second fields of the virtual network input identification and third and fourth registers for respectively holding the third and fourth fields of the virtual output network identification.

* * * * *